United States Patent
Polyudov (10) Patent No.: US 7,406,592 B1
(45) Date of Patent: Jul. 29, 2008

(54) METHOD, SYSTEM, AND APPARATUS FOR EFFICIENT EVALUATION OF BOOLEAN EXPRESSIONS

(75) Inventor: Feliks Polyudov, Suwanee, GA (US)

(73) Assignee: American Megatrends, Inc., Norcross, GA (US)

(*) Notice: Subject to any disclaimer, the term of this patent is extended or adjusted under 35 U.S.C. 154(b) by 177 days.

(21) Appl. No.: 10/948,733

(22) Filed: Sep. 23, 2004

(51) Int. Cl.
G06F 15/177 (2006.01)
G06F 9/00 (2006.01)
G06F 9/30 (2006.01)
G06F 9/45 (2006.01)

(52) U.S. Cl. .................... 713/2; 712/202; 712/223; 717/142; 717/143; 717/162

(58) Field of Classification Search ................ 712/223
See application file for complete search history.

(56) References Cited

U.S. PATENT DOCUMENTS

| | | | | |
|---|---|---|---|---|
| 4,417,305 | A * | 11/1983 | Berstis | 712/223 |
| 4,722,071 | A * | 1/1988 | Gates et al. | 717/141 |
| 5,105,353 | A * | 4/1992 | Charles et al. | 717/143 |
| 5,257,394 | A * | 10/1993 | Asai | 712/7 |
| 5,440,749 | A * | 8/1995 | Moore et al. | 712/206 |
| 6,006,329 | A * | 12/1999 | Chi | 726/24 |
| 6,120,552 | A * | 9/2000 | Kurtzberg et al. | 717/142 |
| 6,341,277 | B1 * | 1/2002 | Coden et al. | 707/2 |
| 6,859,932 | B1 * | 2/2005 | Shann | 719/331 |
| 7,210,130 | B2 * | 4/2007 | Fairweather | 717/136 |
| 7,210,138 | B2 * | 4/2007 | Zatloukal et al. | 717/143 |
| 2002/0184475 | A1 * | 12/2002 | Koch, III | 712/223 |
| 2003/0120909 | A1 * | 6/2003 | Zimmer et al. | 713/2 |
| 2004/0177235 | A1 * | 9/2004 | Koch, III | 712/223 |

OTHER PUBLICATIONS

1995 Sun Microsystems, Inc. obpcmdref manual. "OpenBoot(TM) 3.x Command Reference Manual". Pertinent Pages: chapter 4, pp. 1-27 and chapter 5 pp. 1-4.*

Rastislav Bodik, CS164-Fall 2003, section notes on "Objects and Short-Circuit Code Generation". Published Oct. 22, 2003. Pertinent pp. 1-3.*

(Continued)

Primary Examiner—Eddie P Chan
Assistant Examiner—Idriss Alrobaye
(74) Attorney, Agent, or Firm—Hope Baldauff Hartman, LLC (57) ABSTRACT

Methods, systems, and computer-readable media are provided for efficiently evaluation Boolean expressions. According to the method, the Boolean expression is expressed using pre-fix notation. Each element in the pre-fix expression is then parsed. For each first operand for a Boolean operation, the value of the operand is determined. This may include evaluating a GUID. When an operator and a second operand are encountered, a decision is made as to whether the second operand should be evaluated. The determination as to whether the second operand should be evaluated is made based upon the value of the first operand and the type of operator. If the second operand need not be evaluated, no evaluation is performed thereby saving time and memory space. The evaluation of the Boolean expression continues in this manner until the entire expression has been evaluated. If the Boolean expression is evaluated as true, the program module associated with the Boolean expression may be loaded. Otherwise, the program module will not be loaded.

7 Claims, 6 Drawing Sheets

OTHER PUBLICATIONS

Lecture Notes in Computer Science, Edited by G. Goos and J. Hartmis, "Compiler Construction, An advanced Course"; Springer-Verlag, 1974; pertinent pp. 4-33.*

Clifton et al. "A comparison of space requirements for short-circuit and full evaluation of boolean expressions".*

Lecture Notes in Computer Science, Edited by G. Goos and J. Hartmis, "Compiler Construction, An advanced Course"; Springer-Verlag, 1974; pertinent pp. 4-33; Year of publication: Jun. 1974.*

Clifton et al. "A comparison of space requirements for short-circuit and full evaluation of boolean expressions"; Year of Publication: Apr. 1, 1998.*

* cited by examiner

METHOD, SYSTEM, AND APPARATUS FOR EFFICIENT EVALUATION OF BOOLEAN EXPRESSIONS

BACKGROUND OF THE INVENTION

In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

The EFI is capable of providing services to other applications. Services are implemented by modules that may be loaded by a boot loader when the EFI is started. Because certain services are dependent upon other services for their operation, some modules must be loaded before other modules. In order to ensure that the various modules are loaded in the proper order, each module may provide a list of conditions that must be satisfied before the module can be loaded and executed. The list of conditions is specified as a dependency expression. A dependency expression is a Boolean expression that can be evaluated to a true or false state (the terms '0'/'zero'/'false' are used interchangeably herein, as are the terms '1'/'one'/'true'). If the dependency expression is evaluated as true, the module may be loaded immediately. If the Boolean expression is evaluated as false, the module may be loaded at a later time when the Boolean expression can be evaluated to true. If the Boolean expression cannot be evaluated as true, the module will not be loaded. In this manner, a proper order for loading each of the modules may be determined that takes into account all of the dependencies that a module may have.

Dependency expressions may include the standard Boolean operators AND, OR, and NOT, may include Boolean constants, such as '0' or '1', and may include Boolean variables. Boolean variables are variables that may be evaluated as true or false. One type of Boolean variable is the Globally Unique Identifier ("GUID"). Each service is assigned a GUID that uniquely identifies the service. If a GUID is specified in a dependent expression, it is necessary to evaluate the GUID by determining whether the service that the GUID refers to is currently available. If the service is available, the GUID is evaluated as true. If the service is unavailable, the GUID is evaluated as false.

Evaluation of a GUID specified within a Boolean expression can be a time consuming and memory consuming process. However, memory is very limited during certain phases of firmware initialization. There is also a desire to have each of the EFI services launched as quickly as possible. Therefore, there is a need for a method and system for efficiently evaluating a dependent expression that may include GUIDs within an EFI environment that can reduce the amount of time and memory required to evaluate the expression.

SUMMARY OF THE INVENTION

In accordance with the present invention, the above and other problems are solved by methods, systems, and computer-readable media for efficiently evaluating a Boolean expression. By evaluating the Boolean variables in a Boolean expression in an efficient manner, it is possible to avoid evaluating variables that are not necessary to determine the value of the entire expression. In this manner, the Boolean expression can be evaluated more quickly and using less memory than conventional methods.

According to one embodiment of the invention, a method for efficiently evaluating a Boolean expression having operands and operators is provided. The operators may comprise the Boolean operators AND, OR, or NOT. The operands may comprise Boolean constants, such as zero or one, or may comprise Boolean variables. The Boolean variables may comprise a GUID associated with a program module that provides a service within the EFI environment. Evaluation of a Boolean variable that comprises a GUID may include determining whether the service associated with the GUID is available or not. In this manner, evaluating the GUID converts its value to a true or false value. If the service is available, the GUID resolves to true and if the service is unavailable the GUID resolves to false.

According to the method, the Boolean expression is expressed using pre-fix notation. In this manner, the expression "(A & B)|C" is expressed as "|&ABC" (the symbols "&" and "|" are used herein to represent the AND and OR Boolean operations, respectively"). Each element in the pre-fix expression is then parsed. For each first operand for a Boolean operation, the value of the operand is determined. This may include, for instance, evaluating a GUID.

When an operator and a second operand are encountered, a decision is made as to whether the second operand should be evaluated. The determination as to whether the second operand should be evaluated is made based upon the value of the first operand and the type of operator. If the second operand need not be evaluated, no evaluation is performed thereby saving time and memory space. The evaluation of the Boolean expression continues in this manner until the entire expression has been evaluated. If the Boolean expression is evaluated as true, the program module associated with the Boolean expression may be loaded. Otherwise, the program module will not be loaded.

According to one embodiment, the second operand will not be evaluated if the value of the first operand is true and the operator is an OR operator. This is a consequence of the Boolean property that "1|A=1." As a result, if the value of the first operand is true, it is unnecessary to evaluate the second operand. The second operand will also not be evaluated if the first operand is false and the operator is an AND operator. This is a consequence of the Boolean property that "0 & A=0."

Accordingly, the second operand will not be evaluated if the value of the first operand is false and the operator is an AND operator.

According to embodiments of the invention, an iterative process is provided for determining when a second operand may be skipped or should be evaluated. The iterative process utilizes a stack data structure to store state values indicating how each operand should be handled. The iterative process utilizes an information gathering mode and a decision-making mode. A control loop is also utilized to coordinate switching between the information gathering mode and the decision-making mode. Valuable memory is saved by performing the efficient evaluation of Boolean expressions using an iterative process rather than a recursive process.

The control loop begins its operation in the information-gathering mode. In the information-gathering mode, each element of the Boolean expression is analyzed. When an operator is encountered, state values are placed on the stack indicating that the first operand for the operator is expected. For instance, state values may be placed on the stack indicating "first operand for the AND operation", "first operand for the OR operation", or "operand for the NOT operation." When a constant is encountered, the constant value is saved as a current expression value and the mode is changed to the decision-making mode. The current expression value is a variable that indicates the value of the portion of the Boolean expression that has been presently evaluated. The current expression value also holds the value of the entire Boolean expression when the evaluation process has been completed.

When a Boolean variable is encountered in the information gathering mode, a determination is made as to whether a skip flag has been set. As will be discussed below, the skip flag is a temporary variable that is set when the second operand should be skipped. If the skip flag has been set, the mode is changed to the decision-making mode. If the skip flag has not been set, the variable is evaluated and the value is stored as the current expression value. The mode is then switched to the decision-making mode. An internal pointer is moved to the next element in the Boolean expression. The next element is processed during the next pass through to the information-gathering mode.

When the decision-making mode is first entered, a determination is made as to whether the stack is empty. If the stack is empty, a temporary variable used for storing an indication that the routine should be exited, called the exit condition, is set to true. If the stack is not empty, the state value is popped from the top of the stack and the state value is analyzed. If the state value is "first operand for the AND operation", a determination is made as to whether the current expression value is true or false. If the value is false, the state value for "skipping the second operand of the AND operation" is placed on the stack. This reflects the fact that if the operand is an AND operation and the first operand is false, evaluation of the second operand may be skipped. The skip counter is then incremented so that the evaluation of the next operand will be skipped. The mode is then returned to the information-gathering mode.

If the state value is "first operand for the AND operation" and the current expression value is true, a state value for "expecting the second operand for the binary operation" is placed on the stack. This reflects the fact that the second operand must be evaluated if the value of the first operand is true and the operator is an AND operator. This also occurs if the state value is "first operand for the OR operation" and the current expression value equals false. This reflects the fact that the second operand must be evaluated if the first operand is false and the operator is an OR operator. The mode is then returned to the information gathering mode and control returns to the control loop.

If the state value is "first operand for the OR operation" and the current expression value equals true, a state value for "skipping the second operand of the OR operation" is pushed on the stack and the skip counter is incremented. This reflects the fact that the second operand may be skipped when the value of the first operand is true and the operation is an OR operation. Once the state value has been pushed on the stack and the skip counter incremented, the mode is then returned to the information gathering mode and control returns to the control loop.

If the state value is "skipping the second operand of the AND operation", such as from a previous pass through the decision-making mode, the current expression value is set to false and the skip counter is decremented. If the state value is "skipping the second value of the OR operation", the current expression is set to true and the skip counter is decremented. If the state is "operand for the NOT operation", the current expression value is inverted. If the state value is "expecting the second operation for the binary operation", no action is taken. This is because the value of the binary operation being processed is equal to the value of the second operand (e.g. 1 & X=X; 0|X=X). At this point the value of the current expression value is the value of the second operand of the binary operation, so no processing is required. The routine then returns back to the control loop for further processing.

Back in the control loop, a determination is made as to whether the exit condition has been set. If the exit condition has been set, a determination is also made as to whether an error condition was set. The error condition may be set if an illegal value is encountered in the expression. If no error condition has been set, a determination is made if there are unparsed elements in the expression. If unparsed elements are present, an error is returned. If no unparsed elements exist, a determination is made as to whether there is data on the stack. If data exists on the stack, an error is returned. If no data exists on the stack, the current expression value is returned as the value of the expression. If the value is true, the program module associated with the Boolean expression may be loaded. If the value is false, the program module associated with the Boolean expression will not be loaded. If the exit condition has not been set, the control loop again enters either the decision-making mode or the information-gathering mode.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide methods, systems, apparatuses, and computer-readable media for efficiently evaluating a Boolean expression. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
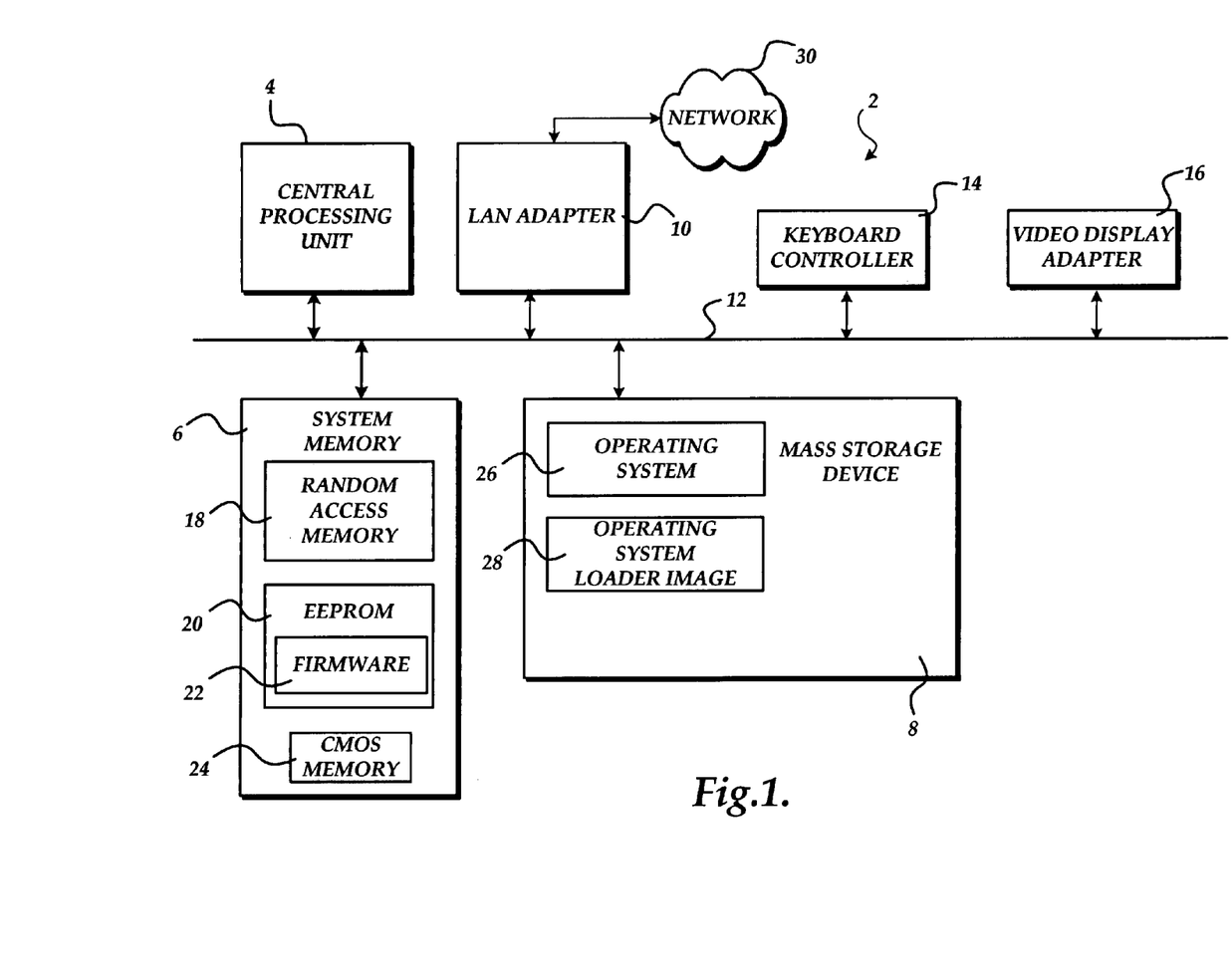
FIG. 1 is a computer architecture diagram that illustrates the various components of a computer utilized in the embodiments of the invention.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 utilized in the various embodiments of the invention will be described. The computer architecture shown in FIG. 1 illustrates a conventional computer, including a CPU 4, a system memory 6, including a RAM 18, an EEPROM 20, a CMOS memory 24, and a system bus 12 that couples the memory to the CPU 4. The EEPROM 20 may store a firmware 22 for use in operating the computer 2, such as a BIOS or an extensible firmware interface ("EFI"), containing the basic routines that help to transfer information between elements within the computer, such as during startup. The CMOS memory 24 is a battery-backed memory device that is used by the firmware 22 to store setting information for the computer 2. Additional details regarding the architecture and operation of the firmware 22 will be provided below with respect to FIGS. 2 and 3.

The computer 2 further includes a mass storage device 8 for storing an operating system 26, an operating system loader image 28, application programs, and other program modules. The mass storage device 8 is connected to the CPU 4 through a mass storage controller (not shown) connected to the bus 12. The mass storage device 8 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a local area network ("LAN") adapter 10 connected to the bus 12. It should be appreciated that the LAN adapter 10 may also be utilized to connect to other types of networks and remote computer systems. The computer 2 may also include a keyboard controller 14 for receiving input from a keyboard and a video display adapter 16 for providing output to a display screen.

Figure 2:
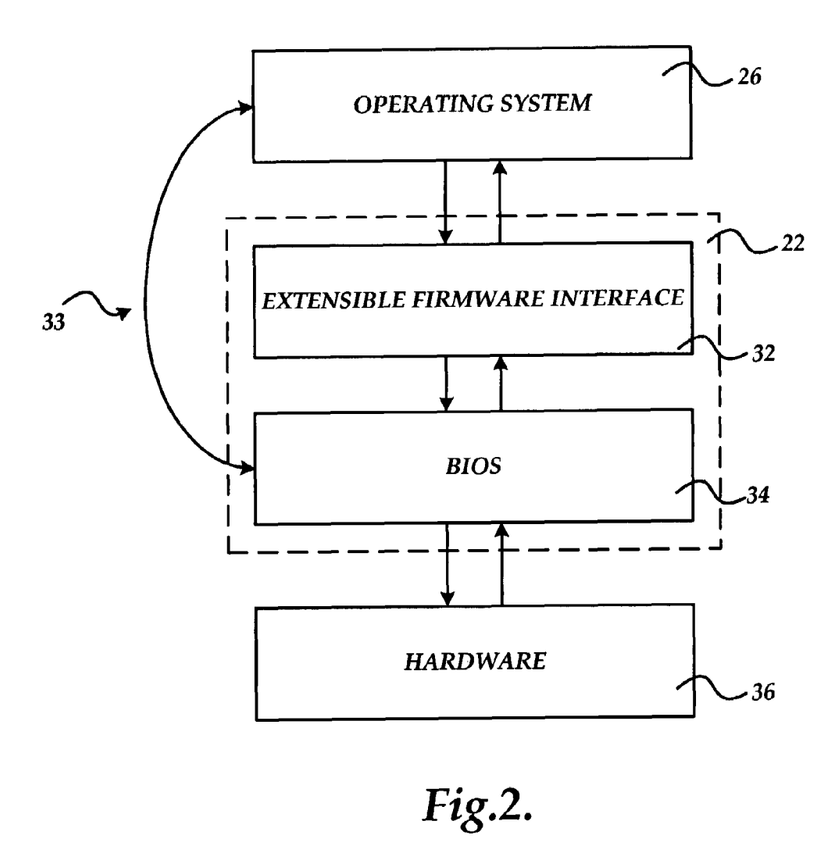
FIGS. 2 and 3 are computer architecture diagrams that illustrate aspects of an extensible firmware interface utilized by the embodiments of the invention.

Referring now to FIG. 2, additional details regarding the operation of the firmware 22 of the computer 2 will be described. According to embodiments of the invention, the firmware 22 may comprise a computer basic input output system ("BIOS"). As known to those skilled in the art, the BIOS of a PC-compatible computer provides an interface between the operating system 26 and the hardware 36 of the computer 2. Alternatively, the firmware 22 may comprise a firmware compatible with the EFI specification from INTEL CORPORATION.

The EFI specification describes an interface between the operating system 26 and the system firmware 22. The EFI specification defines the interface that platform firmware must implement, and the interface that the operating system 26 may use in booting. How the firmware 22 implements the interface is left up to the manufacturer of the firmware. The intent of the specification is to define a way for the operating system 26 and firmware 22 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 32 and a BIOS 34 may be presented in the firmware 22. This allows users and system integrators to support both firmware interfaces. In order to provide this functionality, an interface 33 may be provided for use by legacy operating systems and applications. Additional details regarding the architecture and operation of the EFI 32 are provided below with respect to FIG. 3. Moreover, additional details regarding the operation and architecture of EFI can be found in the EFI specification which is available from INTEL CORPORATION end expressly incorporated herein by reference.

Figure 3:
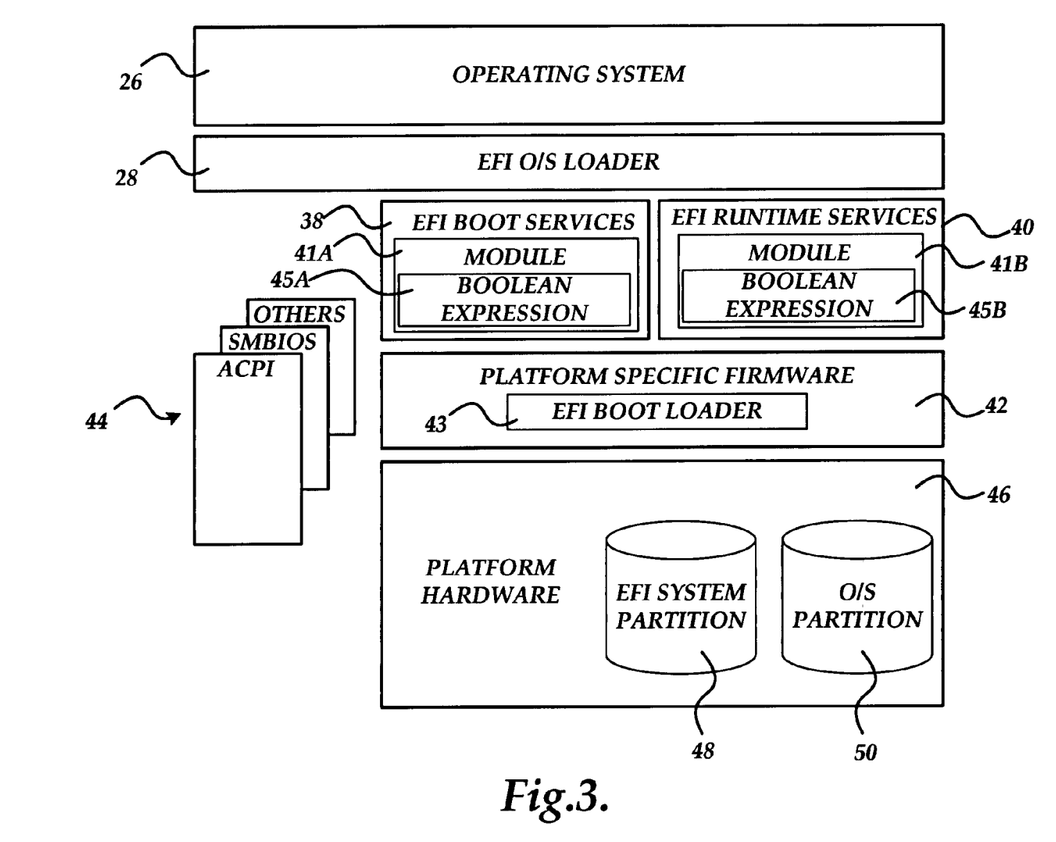

Turning now to FIG. 3, additional details regarding an EFI specification-compliant system utilized to provide an operating environment for the various embodiments of the invention will be described. As shown in FIG. 3, the system includes platform hardware 46 and an operating system 26. The platform firmware 42 may retrieve an OS image from the EFI system partition 48 using an EFI O/S loader 28. The EFI system partition 48 may be an architecturally shareable system partition. As such, the EFI system partition 48 defines a partition and file system that are designed to allow safe sharing of mass storage between multiple vendors. An O/S partition 50 may also be utilized.

Once started, the EFI O/S loader 28 continues to boot the complete operating system 26. In doing so, the EFI O/S loader 28 may use EFI boot services 38, EFI runtime services 40, and interface to other supported specifications to survey, comprehend, and initialize the various platform components and the operating system software that manages them. Thus, interfaces 44 from other specifications may also be present on the system. For example, the Advanced Configuration and Power Management Interface ("ACPI") and the System Management BIOS ("SMBIOS") specifications may be supported.

EFI boot services 38 provide interfaces for devices and system functionality that can be used during boot time. EFI runtime services 40 may also be available to the O/S loader 28 during the boot phase. For example, a minimal set of runtime services may be presented to ensure appropriate abstraction of base platform hardware resources that may be needed by the operating system 26 during its normal operation. EFI allows extension of platform firmware by loading EFI driver and EFI application images which, when loaded, have access to all EFI-defined runtime and boot services.

As shown in FIG. 3, various program modules 41A and 41B provide the boot and runtime services, respectively. These program modules 41A and 41B may be loaded by the EFI boot loader 43 at system boot time. The EFI boot loader 43 is a component in the EFI firmware that determines which program modules should be explicitly loaded and when. Once the EFI firmware is initialized, it passes control to the boot loader 43. The boot loader 43 is then responsible for determining which of the program modules 41A and 41B to load and in what order.

In order to assist the EFI boot loader 43 in the process of determining boot order, each program module 41A and 41B may be associated with a Boolean expression 45A and 45B, respectively. A Boolean expression comprises a logical expression having operands and operators that can be evaluated to a true or false value. The operators may comprise the Boolean operators AND, OR, or NOT. The operands may comprise Boolean constants, such as zero or one, or may comprise Boolean variables. The Boolean variables may comprise a GUID associated with a program module, such as the program modules 41A and 41B, that provides a service within the EFI environment. Evaluation of a Boolean variable that comprises a GUID may include determining whether the service associated with the GUID is available or not. In this manner, evaluating the GUID converts its value to a true or false value. If the service is available, the GUID resolves to true and if the service is unavailable the GUID resolves to false.

As will be described in greater detail below, Boolean expressions are expressed and evaluated utilizing pre-fix notation. In this manner, the expression "(A & B)|C" is expressed as "|&ABC" (the symbols "&" and "|" are used herein to represent the AND and OR Boolean operations, respectively"). Each element in the pre-fix formatted expression is then parsed. If the Boolean expression is evaluated by the EFI boot loader 43 as true, the program module associated with the Boolean expression may be loaded. Otherwise, the EFI boot loader 43 will not load the program module.

Figure 4:
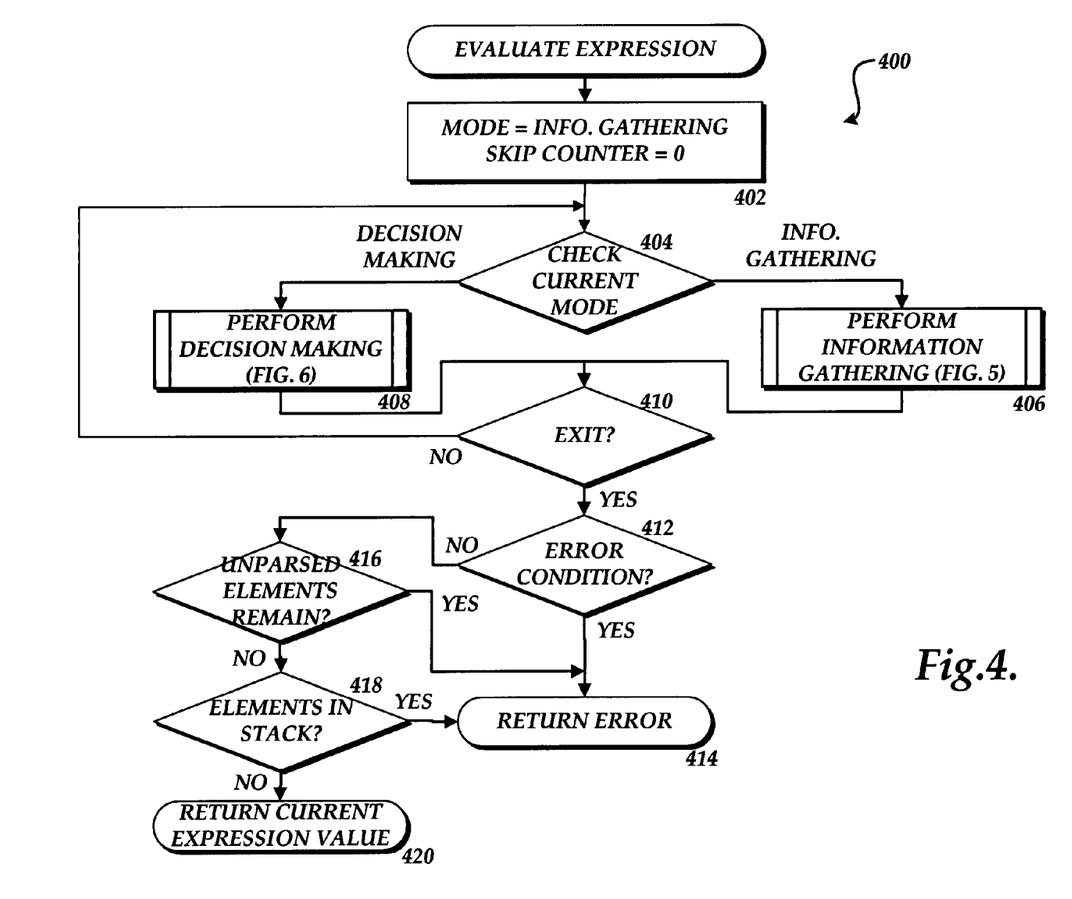
FIGS. 4-6 are flow diagrams illustrating a process for evaluation a Boolean expression according to one embodiment of the invention.
Figure 5:
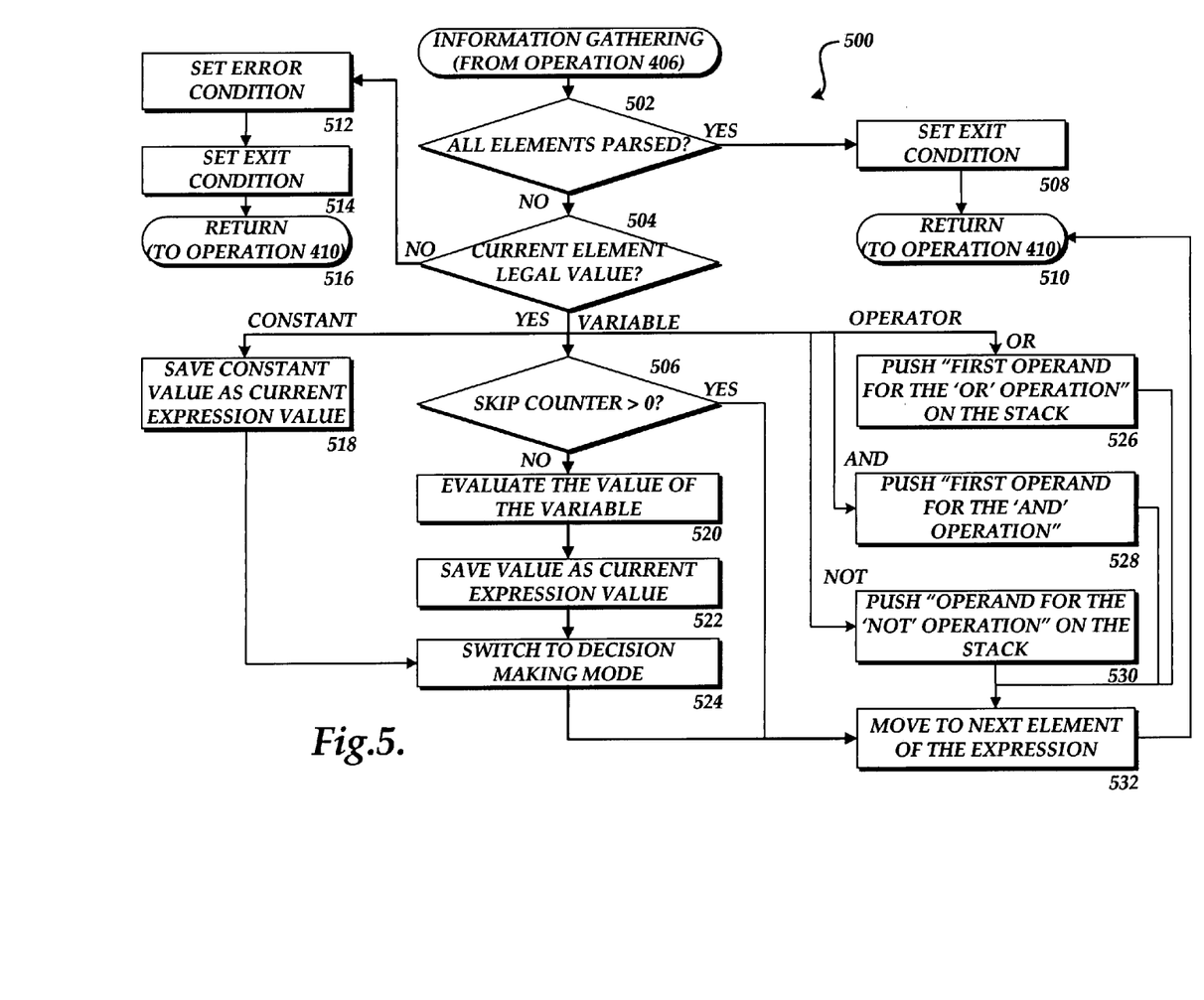
Figure 6:
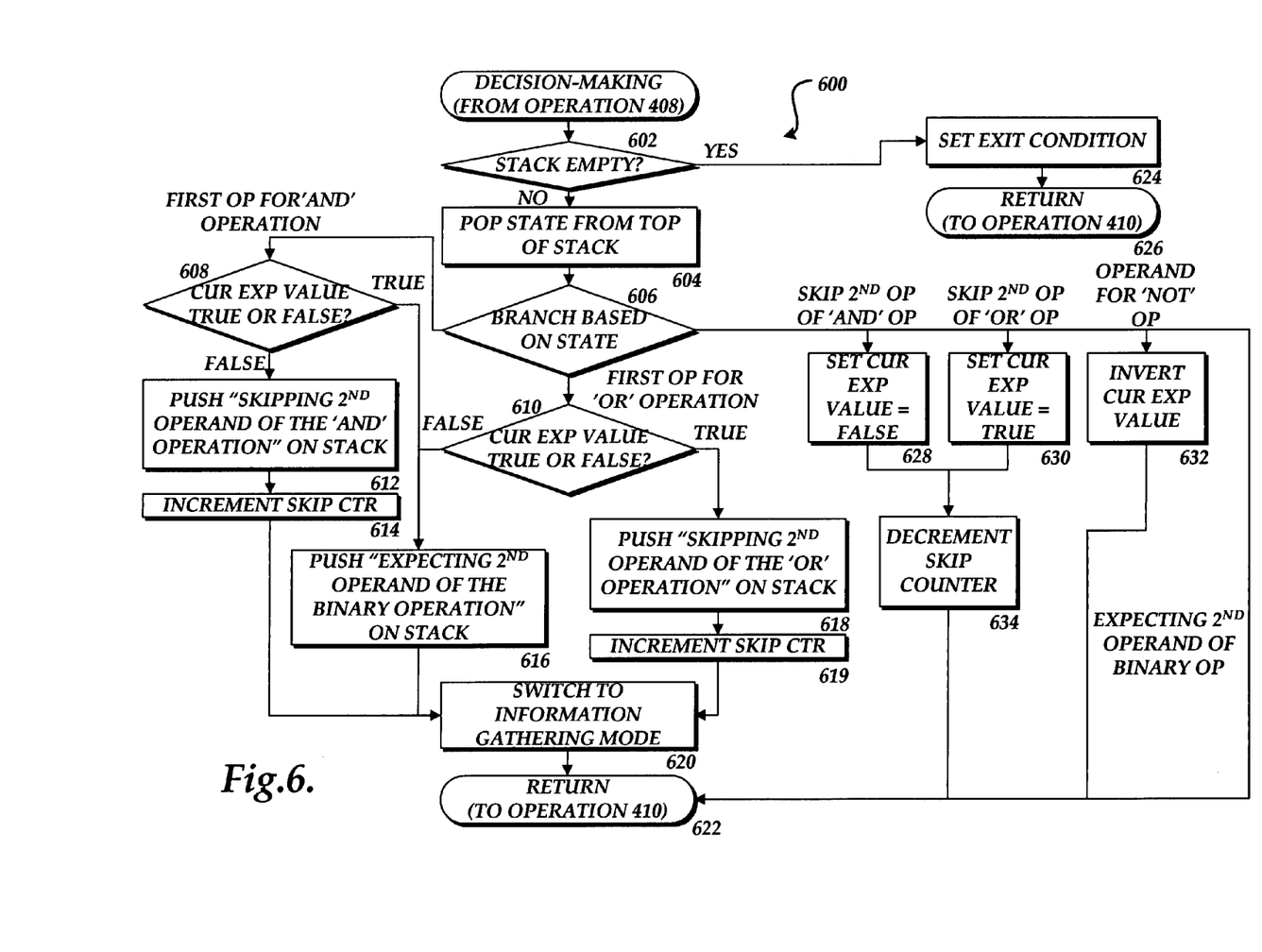

According to embodiments of the invention, an iterative process is provided for determining when a second operand may be skipped or should be evaluated. FIGS. 4-6 illustrate various aspects of the process provided herein. The iterative process utilizes a control loop, an information-gathering mode, and a decision-making mode. The control loop is illustrated in FIG. 4 and is utilized to coordinate switching between the information gathering mode and the decision-making mode, and to determine whether evaluation of the expression has completed or resulted in an error condition. The control loop begins its operation in the information-gathering mode, which is illustrated in FIG. 5.

In the information-gathering mode, each element of a Boolean expression is analyzed. When an operator is encountered, state values are placed on a stack indicating that the first operand for the operator is expected. For instance, state values may be placed on the stack indicating "first operand for the AND operation", "first operand for the OR operation", or "operand for the NOT operation." When a constant is encountered, the constant value is saved as the current expression value and the mode is changed to the decision-making mode.

When a Boolean variable is encountered in the information gathering mode, a determination, is made as to whether a skip flag variable has been set. If the skip flag has been set, the mode is changed to the decision-making mode. If the skip flag has not been set, the variable is evaluated and the value is stored as the current expression value. The mode is then switched to the decision-making mode. An internal pointer is moved to point to the next element in the Boolean expression. The next element is processed during the next pass through to the information-gathering mode.

The decision-making mode is illustrated in FIG. 6. When the decision-making mode is first entered, a determination is made as to whether the stack is empty. If the stack is empty, a temporary variable used for storing an indication that the routine should be exited, called the exit condition, is set to true. If the stack is not empty, the state value is popped from the top of the stack and the state value is analyzed. If the state value is "first operand for the AND operation", a determination is made as to whether the current expression value is true or false. If the value is false, the state value for "skipping the second operand of the AND operation" is placed on the stack. This reflects the fact that if the operation is an AND operation and the first operand is false, evaluation of the second operand may be skipped. The skip counter is then incremented so that the evaluation of the next operand will be skipped. The mode is then returned to the information-gathering mode.

If the state value is "first operand for the AND operation" and the current expression value is true, a state value for "expecting the second operand for the binary operation" is placed on the stack. This reflects the fact that the second operand must be evaluated if the value of the first operand is true and the operator is an AND operator. This also occurs if the state value is "first operand for the OR operation" and the current expression value equals false. This reflects the fact that the second operand must be evaluated if the first operand is false and the operator is an OR operator. The mode is then returned to the information gathering mode and control returns to the control loop.

If the state value is "first operand for the OR operation" and the current expression value equals true, a state value for "skipping the second operand of the OR operation" is pushed on the stack and the skip counter is incremented. This reflects the fact that the second operand may be skipped when the value of the first operand is true and the operation is an OR operation. Once the state value has been pushed on the stack and the skip counter incremented, the mode is then returned to the information gathering mode and control returns to the control loop.

If the state value is "skipping the second operand of the AND operation", such as from a previous pass through the decision-making mode, the current expression value is set to false and the skip counter is decremented. If the state value is "skipping the second value of the OR operation", the current expression is set to true and the skip counter is decremented. If the state is "operand for the NOT operation", the current expression value is inverted. If the state value is "expecting the second operation for the binary operation", no action is taken. This is because the value of the binary operation being processed is equal to the value of the second operand (e.g. 1 & X=X; 0|X=X). At this point the value of the current expression value is the value of the second operand of the binary operation, so no processing is required. The routine then returns back to the control loop for further processing.

Back in the control loop, a determination is made as to whether the exit condition has been set. If the exit condition has been set, a determination is also made as to whether an error condition was set. The error condition may be set if an illegal value is encountered in the expression. If no error condition has been set, a determination is made if there are unparsed elements in the expression. If unparsed elements are present, an error is returned. If no unparsed elements exist, a determination is made as to whether there is data on the stack. If data exists on the stack, an error is returned. If no data exists on the stack, the current expression value is returned as the value of the expression. If the value is true, the program module associated with the Boolean expression may be loaded. If the value is false, the program module associated with the Boolean expression will not be loaded. If the exit condition has not been set, the control loop again enters either the decision-making mode or the information-gathering mode. Additional details regarding the control loop, the information-gathering mode, and the decision-making mode are provided below with respect to FIGS. 4-6, respectively.

The process illustrated in FIGS. 4-6 utilizes a number of temporary variables. In particular, the process utilizes a stack data structure to store state values indicating how each operand should be handled. The process also utilizes a current expression value that is a variable that indicates the value of the portion of the Boolean expression that has been presently evaluated. The current expression value also holds the value of the entire Boolean expression when the evaluation process has been completed. A skip flag variable is also utilized. As will be discussed below, the skip flag is a temporary variable that is set when a second operand should be skipped. A temporary variable is also used for storing an indication that the routine should be exited, called the exit condition. A pointer is also utilized to keep track of the current element within the Boolean expression. The use of these variables is described in greater detail below.

Referring now to FIG. 4, an illustrative routine 400 will be described in detail for efficiently evaluating a Boolean expression within an EFI environment. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 400 begins at operation 402, where the current mode is set to the information gathering mode and the skip counter is set equal to zero. When the skip counter is zero, no operands will be skipped. When the skip counter is not zero, the second operand of an expression will be skipped. From operation 402, the routine 400 continues to operation 404, where a determination as made as to what the current mode is. If the current mode is information gathering, the routine 400 branches to operation 406. The information gathering logic is described below with respect to FIG. 5. If the current mode is decision-making, the routine 400 branches to operation 408. The decision-making logic is described below with respect to FIG. 6. When control returns from the information gathering and decision-making routines, the routine 400 continues to operation 410.

At operation 410, a determination is made as to whether the exit condition variable indicates that the routine should terminate, such as when an error condition has been encountered or when evaluation of the expression has completed. If the exit condition variable has not been set, the routine 400 returns to operation 404. If the exit condition variable has been set, the routine 400 continues to operation 412, where a determination is made as to whether an error condition variable has been set thereby indicating that an error was encountered during the evaluation of the expression. If the error condition variable has been set, the routine 400 continues to operation 414, where an error is returned. If the error condition variable has not been set, the routine 400 branches to operation 416.

At operation 416, a determination is made as to whether an unparsed elements remain in the Boolean expression. If unparsed elements exist, this indicates that an error occurred during the parsing of the expression. Accordingly, the routine 400 branches to operation 414, where an error is returned. If no unparsed elements exist, the routine 400 continues to operation 418, where a determination is made as to whether any data exits on the stack. If data exists on the stack, this also indicates that an error condition has occurred and the routine branches to operation 414, where an error is returned. If no data is on the stack, the routine 400 continues to operation 420, where the value of the current expression value variable is returned as the value of the evaluated Boolean expression. A decision as to whether or not to load a program module may then be made based on the returned value.

Referring now to FIG. 5, additional details regarding the operation of the information-gathering mode will be provided. The routine 500 begins at operation 502 where a determination is made as to whether all of the elements in the Boolean expression have been parsed. If all of the elements have been parsed, the routine 500 branches to operation 508, where the exit condition variable is set to indicate that the routine should be exited. The routine 500 then continues from operation 508 to operation 510, where it returns to operation 410, described above with respect to FIG. 4.

If, at operation 502, it is determined that not all of the elements have been parsed, the routine 500 continues to operation 504. At operation 504, a determination is made as to whether the current element of the expression is a legal value. A legal value comprises an operator, a variable, or a constant. If the current element does not comprise a legal value, the routine 500 branches to operation 512, where the error condition variable is set and to operation 514, where the exit condition variable is set to exit. The routine 500 then continues from operation 514 to operation 516, where it returns to operation 410, described above with respect to FIG. 4.

If, at operation 504, it is determined that the current element is a legal value, the routine 500 continues to operation 518 if the current element is a constant. At operation 518, the value of the constant is saved into the current expression value variable. The routine 500 then continues to operation 524, where the processing mode is switched to the decision-making mode. The routine then continues to operation 532 where the pointer is adjusted to point to the next element in the expression. The routine 500 then continues to operation 510, where it returns to operation 410, described above with respect to FIG. 4.

If, at operation 504, it is determined that the current element is a variable, the routine 500 continues to operation 506. At operation 506, a determination is made as to whether the skip counter has been set. If the skip counter has been set, the routine 500 branches to operation 532, described above. If the skip counter has not been set, the routine 500 continues to operation 520. At operation 520, the value of the variable is determined. This may include, for instance, evaluating a GUID in the manner described herein to arrive at a true or false value. Once the variable has been evaluated, the routine 500 continues to operation 522. At operation 522, the value is saved into the current expression value variable. The routine 500 then continues to operation 524, where the processing mode is switched to the decision-making mode. The routine then continues to operation 532 where the pointer is adjusted to point to the next element in the expression. The routine 500 then continues to operation 510, where it returns to operation 410, described above with respect to FIG. 4.

If, at operation 504, it is determined that the current element is an operator, the routine 500 continues to one the operations 526, 528, or 530. If the current element is the OR operator, the routine continues to operation 526. At operation 526, a state value for "first operand for the OR operation" is placed on the stack indicating that the first operand for the OR operation is expected. If the current element is the AND operator, the routine continues to operation 528, where a state value for "first operand for the AND operation" is placed on the stack indicating that the first operand for the AND operation is expected. If the current element is the NOT operator, the routine continues to operation 430, where a state value for "operand for a NOT operation" is placed on the stack indicating that the operand for a NOT operation is expected. From operations 526, 528, and 530, the routine 500 continues to operation 532, where the pointer is adjusted to point to the next element. The routine 500 then continues to operation 510, where it returns to operation 410, described above with respect to FIG. 4.

Referring now to FIG. 6, additional details will be provided regarding an illustrative routine 600 for decision-making mode processing. The routine 600 begins at operation 602, where a determination is made as to whether the stack is empty. If the stack is empty, the routine 600 branches to operation 624, where the exit condition variable is set. The routine 600 then continues to operation 626, where it returns to operation 410, discussed above with respect to FIG. 4.

If, at operation 602, it is determined that the stack is not empty, the routine 600 continues to operation 604, where the value on the top of the stack is popped off. The routine 600 then continues to operation 606, where a conditional branch is taken depending upon the state value popped from the stack. If the state value popped from the stack is the "first operand for the 'AND' operation", the routine 600 branches to operation 608. At operation 608, a determination is made as to whether the current expression value is true or false. If the current expression value is true, the routine 600 branches from operation 608 to operation 616. At operation 616, a state value for "expecting second operation of the binary operation" is pushed on the stack. This reflects the fact that the second operand must be evaluated if the value of the first operand is true and the operator is an AND operator. As will be discussed in detail below, this also occurs if the state value is "first operand for the OR operation" and the current expression value equals false. This reflects the fact that the second operand must be evaluated if the first operand is false and the operator is an OR operator. From operation 616, the routine 600 continues to operation 620, where the processing mode is switched to the information-gathering mode. The routine 600 then continues to operation 622, where it returns to operation 410, described above.

If, at operation 608, it is determined that the current expression value is false, a state value for "skipping the second operand of the AND operation" is pushed on the stack at operation 612. This reflects the fact that if the operation is an AND operation and the first operand is false, evaluation of the second operand may be skipped. The skip counter is then incremented at operation 614 so that the evaluation of the next operand will be skipped. The mode is then returned to the information-gathering mode at operation 620. The routine then returns to operation 410 at operation 622, described above with respect to FIG. 4.

If, at operation 606, it is determined that the state value popped from the stack corresponds to the "first operand for the OR operation" state, the routine 600 continues from operation 606 to operation 610. At operation 610, a determination is made as to whether the current expression value is true or false. If the current expression value is false, the routine 600 branches to operation 616, where a state value for "expecting second operation of the binary operation" is pushed on the stack. This reflects the fact that the second operand must be evaluated if the first operand is false and the operator is an OR operator. The routine 600 then continues to operation 620, described above.

If, at operation 610, it is determined that the current expression value is true, the routine 600 branches to operation 618, where a state value corresponding to "skipping the second operand of the OR operation" is pushed on the stack. This reflects the fact that the second operand may be skipped when the value of the first operand is true and the operation is an OR operation. Once the state value has been pushed on the stack, the skip counter is incremented at operation 619. The mode is then returned to the information-gathering mode at operation 620 and control returns to the control loop at operation 622.

If, at operation 606, it is determined that the state value popped from the stack corresponds to the "skipping the second operand of the AND operation" state, the routine 600 branches from operation 606 to operation 628. At operation 628, the current expression value is set to false. This reflects the fact that the first operand of the AND operation was evaluated as false and therefore the entire portion of the expression must be false. This is determined without evaluating the second operand. The routine 600 then continues to operation 634, where the skip counter is decremented to indicate that an operand should not be skipped on the next pass through the information-gathering logic.

If, at operation 606, it is determined that the state value popped from the stack corresponds to the "skipping the second operand of the OR operation" state, the routine 600 branches from operation 606 to operation 630. At operation 630, the current expression value is set to true. This reflects the fact that the first operand of the OR operation was evaluated as true and therefore the entire portion of the expression must be true. This is determined without evaluating the second operand. The routine 600 then continues to operation 634, where the skip counter is decremented to indicate that an operand should not be skipped on the next pass through the information-gathering logic.

If, at operation 606, it is determined that the state value popped from the stack corresponds to the "operand for the NOT operation" state, the routine 600 branches from operation 606 to operation 632. At operation 632, the value of the current expression is inverted. That is, if the value is zero it is changed to one. If the value is one it is changed to zero. This performs the NOT operation on the current value of the expression.

If, at operation 606, it is determined that the state value popped from the stack corresponds to the "expecting the second operand of the binary operation" state, the routine 600 branches from operation 606 to operation 622 and no additional action is taken. This is because the value of the binary operation being processed is equal to the value of the second operand (e.g. 1 & X=X; 0|X=X). At this point the value of the current expression value is the value of the second operand of the binary operation, so no processing is required. The routine then returns back to the control loop for further processing.

It should be appreciated that embodiments of the present invention provide methods, systems, apparatuses, and computer-readable media for efficiently evaluating a Boolean expression. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for efficiently evaluating a Boolean expression comprising two or more operands and one or more operators, the method comprising:
    (a) parsing a first operator from the Boolean expression, wherein the Boolean expression is associated with a program module;
    (b) in response to parsing the first operator, storing on a stack a state value indicating that an operand is expected for the first operator;
    (c) repeating operations (a)-(b) for each of the operators in the Boolean expression;
    (d) evaluating a first operand from the Boolean expression to determine a value of the first operand;
    (e) in response to determining the value of the first operand, retrieving a state value from the stack;
    (f) determining whether to evaluate a second operand from the Boolean expression based on the value of the first operand and the state value retrieved from the stack;
    (g) in response to determining that the second operand should not be evaluated, skipping the evaluation of the second operand;
    (h) repeating operations (d)-(g) for each of the operands in the Boolean expression to evaluate the Boolean expression as true or false;
    (i) loading the program module via an extensible firmware interface if the Boolean expression is evaluated as true, the extensible firmware interface providing an interface between an operating system and system firmware; and
    (j) terminating operation (h) and returning an error if an error is encountered during the evaluation of the first operand or the second operand.

2. The method of claim 1, wherein determining whether to evaluate a second operand from the Boolean expression based on the value of the first operand and the state value retrieved from the stack comprises skipping the second operand in response to determining that the value of the first operand is false and that the state value corresponds to an AND operator.

3. The method of claim 2, wherein determining whether to evaluate a second operand from the Boolean expression based on the value of the first operand and the state value retrieved from the stack comprises skipping the second operand in response to determining that the value of the first operand is true and that the state value corresponds to an OR operator.

4. A computer storage medium having computer-executable instructions stored thereon which, when executed by a computer, cause the computer to perform the method of claim 1.

5. A method for determining whether a program module should be loaded within an extensible firmware interface environment, the method comprising:
    (a) associating a Boolean expression with the program module, the Boolean expression comprising one or more operands and one or more operators and indicating that the program module may be loaded when the Boolean expression is evaluated as true;
    (b) parsing the Boolean expression for the one or more operators until encountering the one or more operands;
    (c) in response to encountering an operator during parsing, storing a state value indicating that a first operand for the operator is expected on a stack;
    (d) parsing a first operand from the Boolean expression in response to encountering the one or more operands;
    (e) evaluating the first operand to obtain a true or false value for the first operand;
    (f) in response to obtaining the true or false value for the first operand, retrieving a state value from the stack;
    (g) determining whether to evaluate the second operand or to skip the evaluation of the second operand based upon the state value retrieved from the stack and the true or false value for the first operand;
    (h) in response to determining that evaluation of the second operand should be skipped, not performing an evaluation of the second operand;
    (i) in response to determining that the second operand should be evaluated, evaluating the second operand within the Boolean expression to obtain a true or false value for the second operand;
    (j) repeating the operations (d)-(i) until the entire Boolean expression has been evaluated as true or false; and
    (k) loading the program module via an extensible firmware interface in response to determining that the Boolean expression has been evaluated as true, the extensible firmware interface providing an interface between an operating system and system firmware; and
    (l) terminating operation (j) and returning an error if an error is encountered during the evaluation of the first operand or the second operand.

6. A computer storage medium having computer-executable instructions stored thereon which, when executed by a computer, cause the computer to perform the method of claim 5.

7. The method of claim 1, wherein the Boolean expression is arranged according to pre-fix notation.

* * * * *

UNITED STATES PATENT AND TRADEMARK OFFICE
CERTIFICATE OF CORRECTION

| | |
|---|---|
| PATENT NO. | : 7,406,592 B1 |
| APPLICATION NO. | : 10/948733 |
| DATED | : July 29, 2008 |
| INVENTOR(S) | : Feliks Polyudov |

It is certified that error appears in the above-identified patent and that said Letters Patent is hereby corrected as shown below:

Title page, item (57) Abstract: line 1, and ending in line 2 should read:

--Methods, systems, and computer-readable media are provided for efficiently ~~evaluation~~ evaluating Boolean expressions.--.

Column 5, lines 4 - 6 should read:

--FIGURES 4-6 are flow diagrams illustrating a process for evaluation of a Boolean expression according to one embodiment of the invention.--.

Column 6, lines 58 - 61 should read:

--Moreover, additional details regarding the operation and architecture of EFI can be found in the EFI specification which is available from INTEL CORPORATION [[end]] and is expressly incorporated herein by reference.--.

Column 10, lines 19 - 22 should read:

--At operation 410, a determination is made as to whether the exit condition variable indicates that the routine should terminate, such as when an error condition has been encountered or when evaluation of the expression has been completed.--.

Column 10, lines 33 - 34 should read:

--At operation 416, a determination is made as to whether [[an]] any unparsed elements remain in the Boolean expression.--.

UNITED STATES PATENT AND TRADEMARK OFFICE
CERTIFICATE OF CORRECTION

PATENT NO.         : 7,406,592 B1
APPLICATION NO. : 10/948733
DATED              : July 29, 2008
INVENTOR(S)        : Feliks Polyudov It is certified that error appears in the above-identified patent and that said Letters Patent is hereby corrected as shown below:

Column 14, lines 50 - 51 should read:

--(j) repeating the operations (d)-(i) until the entire Boolean expression has been evaluated as true or false; ~~and~~.--.

Signed and Sealed this

Thirtieth Day of September, 2008

JON W. DUDAS
*Director of the United States Patent and Trademark Office*